(12) United States Patent
Endo

(10) Patent No.: US 7,616,874 B2
(45) Date of Patent: Nov. 10, 2009

(54) IMAGE-TAKING APPARATUS

(75) Inventor: Hiroshi Endo, Asaka (JP)

(73) Assignee: Fujifilm Corporation, Tokyo (JP)

( * ) Notice: Subject to any disclaimer, the term of this patent is extended or adjusted under 35 U.S.C. 154(b) by 409 days.

(21) Appl. No.: 11/357,070

(22) Filed: Feb. 21, 2006

(65) Prior Publication Data

US 2006/0193622 A1 Aug. 31, 2006

(30) Foreign Application Priority Data

Feb. 25, 2005 (JP) ............................. 2005-050022

(51) Int. Cl.
*G03B 15/03* (2006.01)
(52) U.S. Cl. ........................ 396/61; 396/157; 396/164
(58) Field of Classification Search ................... 396/61, 396/157, 164, 182; 348/370, 371
See application file for complete search history.

(56) References Cited

U.S. PATENT DOCUMENTS

| | | | |
|---|---|---|---|
| 5,448,330 A * | 9/1995 | Takagi | ........................ 396/106 |
| 6,993,255 B2 * | 1/2006 | Braun et al. | ................... 396/61 |

FOREIGN PATENT DOCUMENTS

| | | |
|---|---|---|
| JP | 4-371940 A | 12/1992 |
| JP | 6-203986 A | 7/1994 |
| JP | 8-292469 A | 11/1996 |
| JP | 2000-111982 A | 4/2000 |
| JP | 2000-338563 A | 12/2000 |
| JP | 2001-215579 A | 8/2001 |

* cited by examiner

*Primary Examiner*—W B Perkey
(74) *Attorney, Agent, or Firm*—Birch, Stewart, Kolasch & Birch, LLP

(57) ABSTRACT

An image-taking apparatus includes two-dimensionally arranged LEDs for emitting fill lights to eradiation areas. The image-taking apparatus also includes light-receiving sensors for respectively receiving reflected lights from the irradiation areas. The amount of the fill lights or the emission and ceasing of the fill lights are independently controlled so that a correct exposure can be obtained.

2 Claims, 13 Drawing Sheets

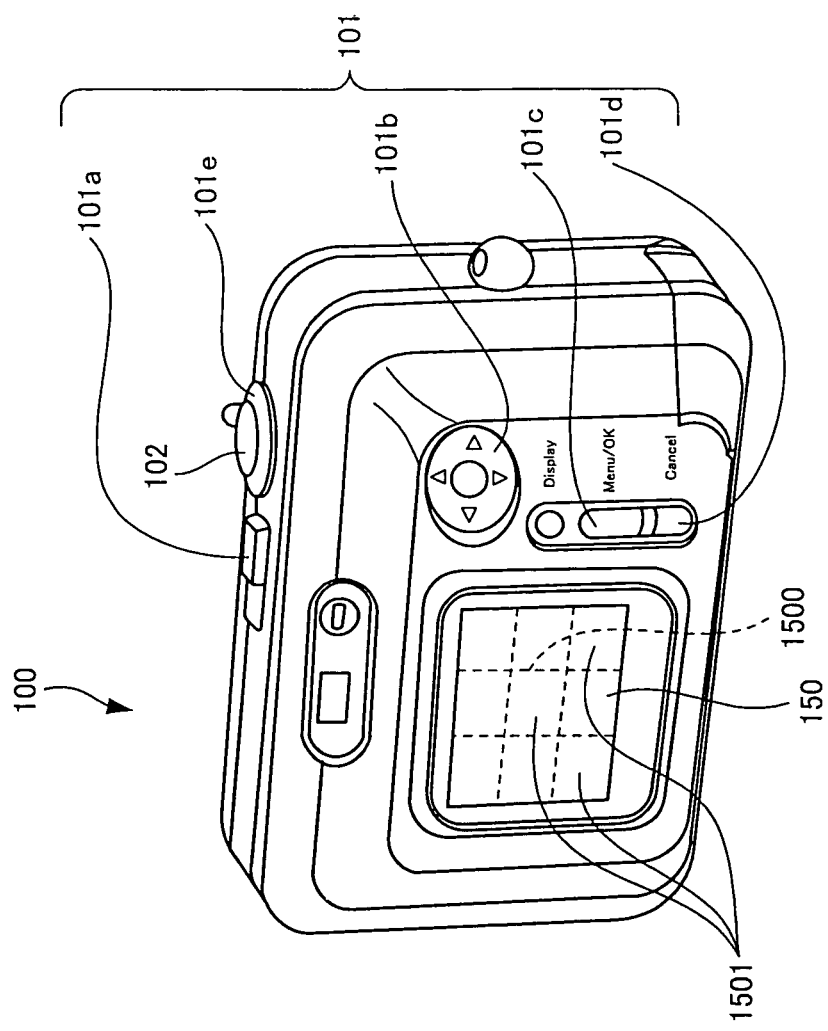
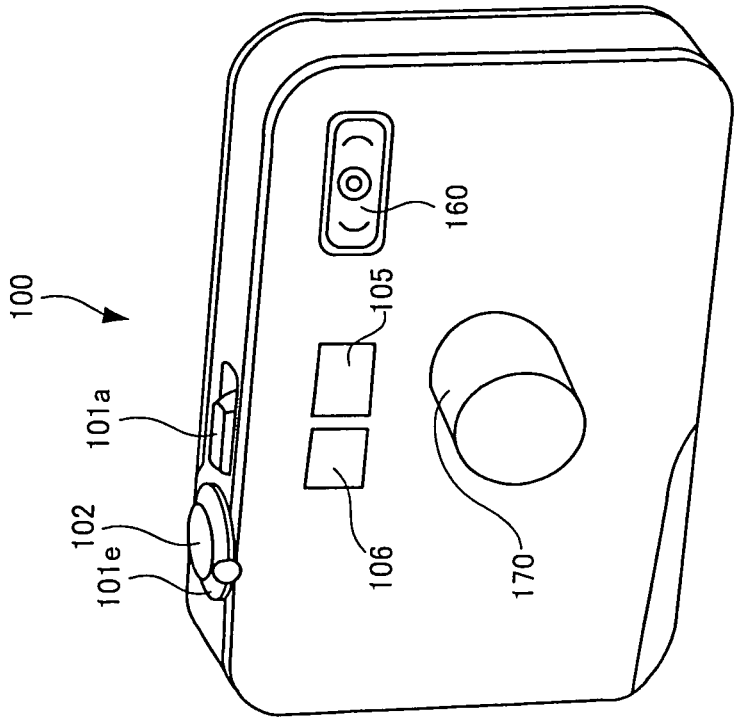

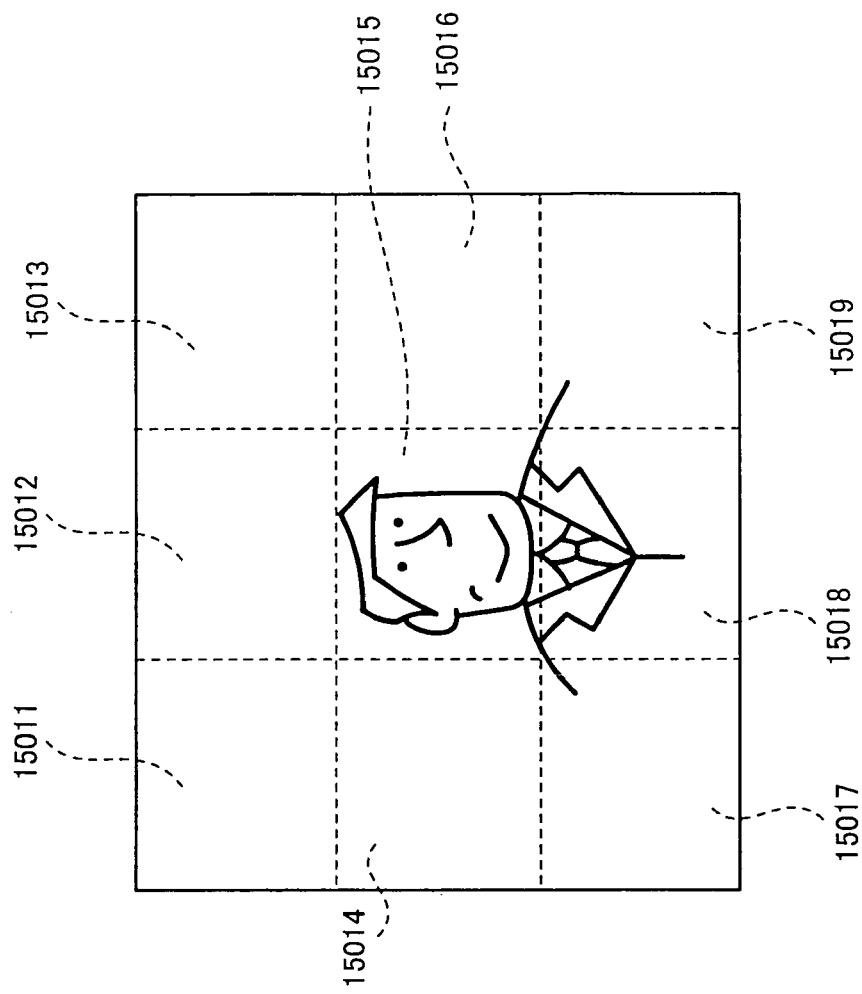
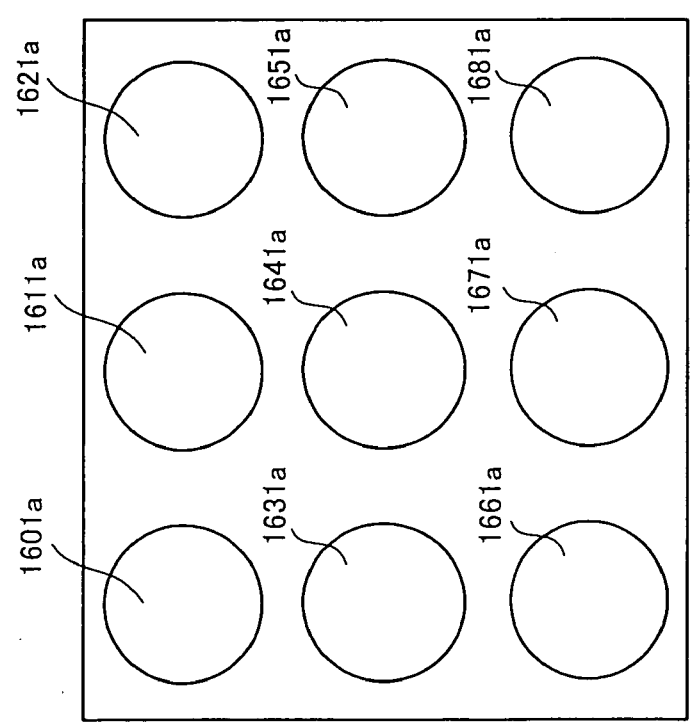
Fig. 8 (b)
Fig. 8 (a)

IMAGE-TAKING APPARATUS

BACKGROUND OF THE INVENTION

1. Field of the Invention

The present invention relates to an image-taking apparatus that includes an imaging device and generates image signals by forming a subject image on the imaging device.

2. Description of the Related Art

The emergence of blue light-emitting diodes has made it possible to generate white light with light-emitting diodes. As a result, there is a trend to replace incandescent lamps consuming a large amount of power with light-emitting diodes (LED) consuming a small amount of power for the purpose of reducing power consumption. Such a trend has been also seen in the field of digital cameras and the LEDs are replacing xenon tubes used for fill in shooting (see Japanese Patent Application Publication No. 2001-215579 for example).

It is possible to employ multiple light emitters such as LED and allow them to emit fill-flash lights with various light distributions for shooting by changing the light distributions. However, in order to obtain a correct exposure for the entire screen while emitting fill-flash lights with various light distributions to a subject, it is necessary to adjust the lights by, for example, individually stopping light emissions from the light emitters.

It is possible to obtain a correct exposure to a subject in the center with conventional light emitters having a constant light distribution by employing techniques such as one disclosed in Japanese Patent Application Publication No. 6-203986. However, a correct exposure for the entire screen cannot be achieved by use of the technique disclosed in this publication alone.

SUMMARY OF THE INVENTION

The present invention has been made in view of the above circumstances, and provides an image-taking apparatus that includes a light adjustment function capable of obtaining a correct exposure for the entire screen regardless of subject position and distance.

The invention provides a first image-taking apparatus which has an imaging device and generates image signals by forming a subject image on the imaging device, including:

a light-emitting section which emits independently-controlled light to irradiation areas into which a shooting angle of view is two-dimensionally divided;

a light-receiving section which receives reflected light independently from the irradiation areas; and an emission-controlling section which causes the light-emitting section to emit fill light for shooting to the irradiation areas, and which also causes the light-emitting section to stop the emission of fill light for shooting to the irradiation areas based on the amount of reflected light from the irradiation areas received by the light-receiving section, when taking an image.

According to the first image-taking apparatus, independently-controlled fill light with various light distributions used for shooting can be emitted by the light-emitting section to irradiation areas. In addition, reflected light from the irradiation areas is received by the light-receiving section to measure the amount of received light so that the emission of the fill light can be stopped to obtain a correct exposure.

Therefore, there is provided an image-taking apparatus having a light adjustment function to obtain a correct exposure for the entire.

The invention also provides a second image-taking apparatus which has an imaging device and generates image signals by forming a subject image on the imaging device, including:

a light-emitting section which emits independently-controlled light to irradiation areas into which a shooting angle of view is two-dimensionally divided;

a light-receiving section which receives reflected light independently from the irradiation areas; and an emission-controlling section which causes the light-emitting section to emit pre-emission light to the irradiation areas before taking an image and which causes the light-emitting section to emit fill light for shooting to the irradiation areas based on the amount of reflected light from the irradiation areas received by the light-receiving section, which is resulted from the pre-emission light, when taking an image.

According to the second image-taking apparatus of the invention, the emission-controlling section causes the light-emitting section to emit pre-emission light to the irradiation areas before shooting. Then, the emission-controlling section causes the light-emitting section to emit fill light to the irradiation areas based on the amount of reflected light from the irradiation areas received by the light-receiving section so that a necessary amount of fill light can be measured and subsequently shooting is performed.

In other words, the emission-controlling section adjusts the amount of fill light to be emitted to the irradiation areas to obtain a correct exposure.

Accordingly, there is provided an image-taking apparatus having a light adjustment function to obtain a correct exposure for the entire.

The second image-taking apparatus may further include a sensitivity-adjusting section which adjusts a light-reception sensitivity when image signals are generated based on subject light received byte imaging device, wherein the emission-controlling section causes the light-emitting section to emit pre-emission light after causing the sensitivity-adjusting section to set a light-reception sensitivity to a value higher than that of a light-reception sensitivity to be used for taking an image.

When the imaging device is made to serve as a light-receiving section that receives reflected light resulting from pre-emission light, it is possible to adjust the light affected by the conditions of subject light received by the imaging device at the time of shooting.

Generally, it is possible to give sufficient light to the imaging device as long as the shutter speed and the time to receive subject light by an imaging device are reduced, even when the sensitivity is not made higher. However, in order to allow the imaging device to receive reflected light resulting from pre-emission light, it is desirable to emit a small amount of pre-emission light for a short time.

Considering these situations, the emission-controlling section of the invention is configured such that it causes the sensitivity-adjusting section to set a higher sensitivity by increasing a gain of an amplifier circuit arranged subsequent to the imaging device or causes a signal processing section arranged in a later stage to set a higher sensitivity after mixing pixels, thereby obtaining a light-reception sensitivity higher than that to be used for shooting. After that, the emission-controlling section causes the light-emitting section to emit pre-emission light. This allows the imaging device to receive a small amount of pre-emission light for a short time.

Because the amount of pre-emission light and the emission time are reduced in this way, power can be saved according to this feature.

In addition, the second image-taking apparatus of the invention may further include a distance-measuring section which measures a subject distance, wherein the emission-controlling section causes the light-emitting section to emit pre-emission light whose amount is based on a result of distance measurement by the distance-measuring section.

Since this emission-controlling section causes the light-emitting section to emit an appropriate amount of pre-emission light according to a subject distance to each area, power can be saved.

Further, in the second image-taking apparatus, the emission-controlling section may cause the light-emitting section to emit pre-emission light whose amount is sequentially changed with time.

With this additional feature, timing for receiving reflected light by a pixel group corresponding to each area of the imaging device is changed per area.

The difference in timing between areas can be equal to the difference in subject distance between areas and therefore it is possible to obtain the same effects as those obtained by a case where an amount of pre-emission light is emitted according to a subject distance.

As mentioned above, the light-receiving section may be an imaging device serving as a light-receiving sensor or may be other separate element.

Furthermore, in the first and second image-taking apparatus, the light-emitting section may include light sources which emit lights to the irradiation areas. Still furthermore, the light-emitting section may include a light source that irradiates an entire shooting angle of view with a light and a light-amount adjusting section that independently adjusts the amounts of light fluxes forming a light emitted from the light source to the irradiation areas.

These additional features make it possible to emit fill light with various light distributions to a subject by changing the amounts of light fluxes towards the respective irradiation areas.

As described above, according to the invention, it is possible to realize an image-taking apparatus having a light adjustment function to obtain a correct exposure for the entire screen regardless of subject position and distance.

BRIEF DESCRIPTION OF THE DRAWINGS

FIG. 1(a) is a perspective view of the front of a digital camera according to a first embodiment, as viewed obliquely from above;

FIG. 1(b) is a perspective view of the back of the digital camera according to the first embodiment, as viewed obliquely from above;

FIG. 8(a) is a diagram showing a subject area to be captured by an image-taking optical system built in a lens barrel shown in FIGS. 6(a) and 6(b);

FIG. 8(b) is another diagram showing a subject area to be captured by the image-taking optical system built in the lens barrel shown in FIGS. 6(a) and 6(b);

DETAILED DESCRIPTION OF THE INVENTION

Figure 2:
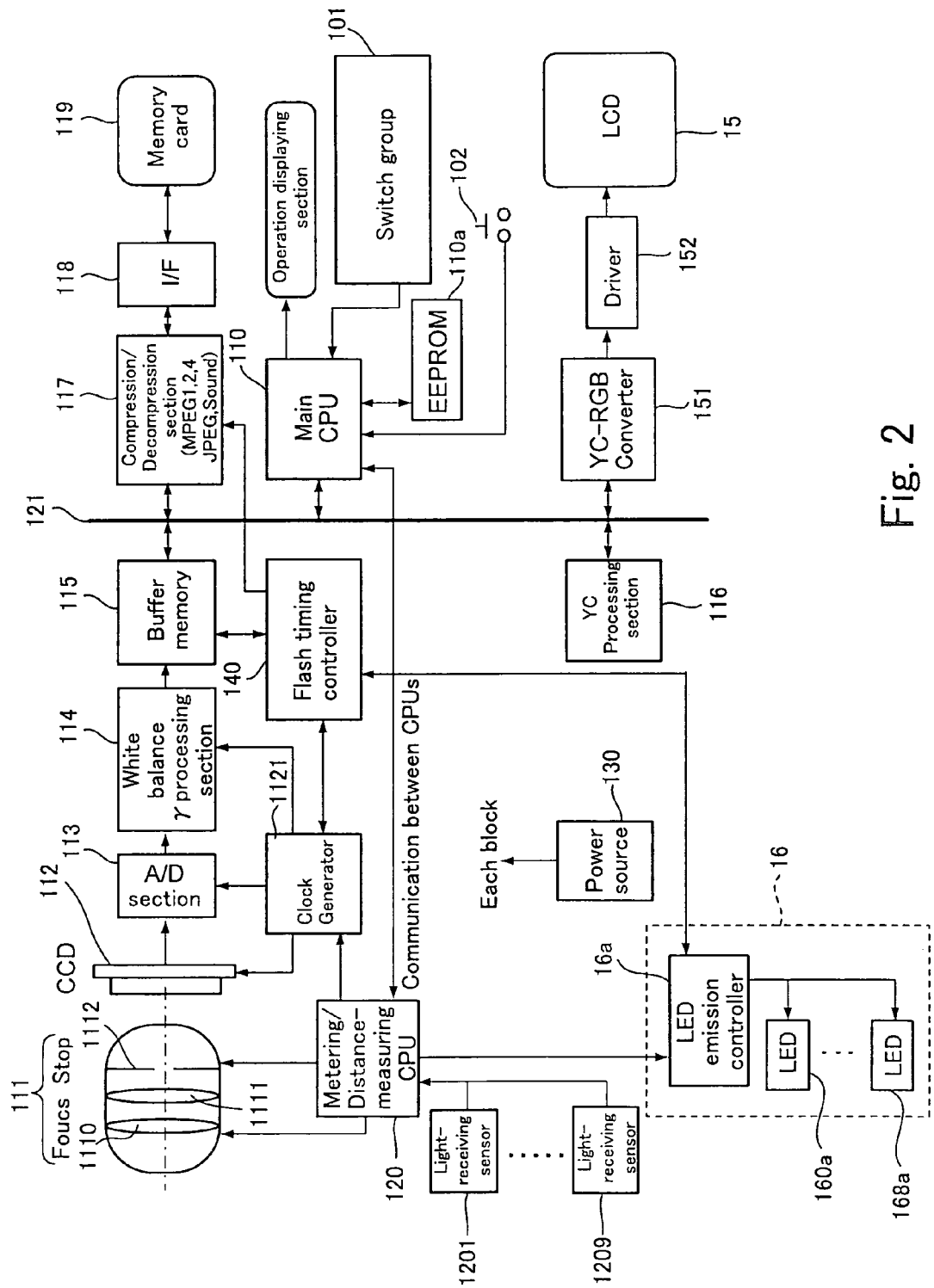
FIG. 2 is a functional block diagram of the digital camera shown in FIG. 1.

Embodiments of the present invention will be described with reference to the drawings.

FIGS. 1(a) and 1(b) show a digital camera according to a first embodiment of the image-taking apparatus of the present invention.

FIGS. 1(a) and 1(b) are perspective views of the front and back of the digital camera according to the first embodiment, as viewed obliquely from above, respectively.

As shown in FIG. 1(a), a digital camera 100 of the present embodiment has a lens barrel 170 with a built-in shooting lens and a charge-coupled device (CCD) solid imaging device (hereinafter referred to as "CCD"), in which an image of a subject is led to the CCD through the shooting lens. The digital camera 100 is configured such that the CCD generates image signals representing a through image (live view) or a taken image and a main CPU performs through-the-lens (TTL) distance measurement and TTL metering to detect a subject distance and subject brightness. The CCD and the main CPU will be described later more in detail.

A shooting angle of view is two-dimensionally divided into distance-measurement areas and the TTL distance measurement is performed in each of these areas. Similarly, a shooting angle of view is two-dimensionally divided into metering areas and the TTL metering is performed in each of these areas. In the following description, such distance-measurement areas and metering areas are associated with each other in a one-to-one relationship.

The digital camera 100 is also configured such that a fill-flash emitter emits independently-controlled fill-flash lights with various light distributions in shooting through a fill-flash window 160 to irradiation areas serving both as the distance-measurement areas and the metering areas. In addition, the digital camera 100 has a light adjustment function including light-receiving sensors that receive reflected lights from the irradiation areas through a light adjustment window 106 formed next to a finder 105 on the front of the camera body. The light-receiving sensors are disposed in the digital camera 100 such that they are respectively associated with the irradiation areas.

Further, as shown in FIG. 1(b), the digital camera 100 has a switch group 101 to be operated by a user on the back and top thereof.

The switch group 101 includes a power switch 101a, a cross key 101b, a menu/OK key 101c, a cancel key 101d, a mode lever 101e and the like. The mode lever 101e is used to switch between a playback mode and a shooting mode and to switch between a moving-image mode and a still-image mode in the shooting mode. When the shooting mode is selected by the mode lever 101e, a through image is displayed and a user can take an image by pressing a shutter button 102 while looking at the through image. When the playback mode is selected by the mode lever 101e, a taken image is displayed on a LCD panel 150.

The shooting mode of the digital camera 100 includes various autofocus (AF) modes such as a selected-area AF mode, an auto-area AF mode and the like. If the selected-area AF mode is selected by the menu/OK key 101c through a user operation in the shooting mode, a shooting angle of view divided into areas 1501 by assistant lines 1500 are displayed together with a through image on the LCD panel 150 as shown in FIG. 1(b). If a user selects any of the areas 1501 in this state by operating the cross key 101c, the selected area is set up as an AF area.

In the digital camera 100 of the first embodiment, a metering/distance-measuring CPU 120 causes a light-emitting unit 16 to emit a fill-flash light (used for shooting) to a subject according to the level of subject brightness through communication between the metering/distance-measuring CPU 120 and a main CPU 110. The light-emitting unit 16 includes multiple LEDs and the amount of light from the LEDs is controlled by a LED emission controller 16a so that the fill-flash lights with various light distributions are emitted to a subject. The metering/distance-measuring CPU 120, main CPU 110, light-emitting unit 16 and LED emission controller 16a will be described later in detail with reference to FIG. 2.

When fill-flash lights are emitted, reflected lights from a subject are led to the light-receiving sensors in the digital camera 100 through the light adjustment window 106 and therefore, the emission of fill-flash lights can be stopped immediately after a correct exposure is obtained. The details will be described later.

Meanwhile, the release button 102 has two operation modes: full press and half press. When the release button 102 is half pressed, TTL metering and TTL distance measurements are both performed. Then, an aperture is set up on the optical axis according to a photometric value and a focus lens is arranged at a focus position matching a measured subject distance. Subsequently, when the release button 102 is fully pressed, an electronic shutter is set in the CCD and exposure is performed to take an image. If it is determined that the emission of a fill-flash is necessary at the time of a half press, independently-controlled fill-flash lights are emitted through the fill-flash window 160 at the time of a full press to the irradiation areas which correspond to the areas 1501 shown in FIG. 1(b) and serve both as the distance-measurement areas and the metering areas.

FIG. 2 is a functional block diagram of the digital camera 100 shown in FIG. 1.

The configuration of the digital camera 100 will be described with reference to FIG. 2 in terms of signal processing.

The digital camera 100 of the first embodiment includes a main CPU 110 that controls all processing in the digital camera 100. The main CPU 110 receives operation signals from the switch group 101 shown in FIG. 1(b). The main CPU 110 includes an EEPROM 110a that stores programs necessary for the operation of the digital camera 100. When the power switch 101a of the digital camera 100 having such a configuration is pressed, the main CPU 110 controls all the operation of the digital camera 100 according to procedures described in the programs stored in the EEPROM 110a.

First, the flow of image signals will be described with reference to FIG. 2.

When the power switch 101a (see FIG. 1) is pressed, the main CPU 110 detects the power switch 101a being pressed and a power source 130 supplies power to blocks such as the main CPU 110, metering/distance-measuring CPU 120 and the like. If the shooting mode is selected by the mode lever 101e (see FIG. 1) at the time of turning-on of the power source 130, image signals representing a subject image formed on the CCD 112 are thinned out and output at predetermined intervals so that the subject image represented by the output image signals is displayed on the LCD panel 150 (see FIG. 1) of an LCD 15. The CCD 112 receives timing signals from a clock generator (hereinafter referred to as "CG") 1121. Image signals are thinned out and output at predetermined intervals in synchronization with such timing signals. The CG 1121 outputs timing signals under instructions from the main CPU 110. Such timing signals are also sent to, in addition to the CCD 112, an A/D section 113 and a white-balance adjustment γ processing section 114 which are provided in subsequent stages. Accordingly, image signals are sequentially processed in synchronization with the timing signals in the CCD 112, the A/D section 113 and the white-balance adjustment γ processing section 114.

After the sequential processing by the A/D section 113 and the white-balance adjustment γ processing section 114 in synchronization with the timing signals from the CG 1121 under instructions from the main CPU 110, image signals are sent from the white-balance adjustment γ processing section 114 to a YC processing section 116 through a bus 121. When sending image signals through the bus 121, if the sequentially processed image signals are directly sent from the white-balance adjustment γ processing section 114 to the YC processing section 116, processing timing may not be smooth between the white-balance adjustment γ processing section 114 and the YC processing section 116. Therefore, subsequent to the white-balance adjustment γ processing section 114, a buffer memory 115 is provided to adjust timing for transferring image signals to the YC processing section 116 at predetermined intervals. From the buffer memory 115, image signals stored earlier are transferred first to the YC processing section 116 where the image signals are converted into YC signals through RGB-YC signal conversion. The YC signals are then sent to the LCD 15 side via the bus 121. Prior to the LCD 15, there is provided an YC-RGB converter 151 where the received YC signals are again converted into RGB signals that are then sent to the LCD 15 via a driver 152. The LCD 15 displays an image of a subject on the LCD panel 150 of the LCD 15 based on the received RGB signals. In this way, image signals are kept being generated by the CCD 112 and processed by the A/D section 113 and the white-balance adjustment γ processing section 114 in synchronization with timing signals output from the CG 1121. Therefore, an image of a subject to which the shooting lens is directed is continuously displayed on the LCD panel 150 of the LCD 15. When a user presses the release button 102 while looking at a continuously displayed subject image, after a lapse of predetermined time from the press of the release button 102, all the image signals of a subject image formed on the CCD 112 are output as RGB signals. These RGB signals are converted into YC signals in the YC processing section 116 and the YC signals are compressed by a compression/decompression section 117. Then, the compressed signals are recorded in a memory card 119 via an I/F 118. In the compression/decompression section 117, signals of still images are compressed by a compression method in conformity with JPEG standards and stored in the memory card 119 as a file. The file stored in the memory card 119 has a header in which compression information and shooting information are written. When the playback mode is selected by the mode lever 101e of the digital camera 100, the header of the file is read out from the memory card 119 first. Then, based on the compression information in the header read out, the compressed image signals in the file are decompressed to be restored to the original image signals. Subsequently, a subject image based on the restored original image signals is displayed on the LCD panel 150.

The digital camera 100 of the present embodiment is provided with the metering/distance-measuring CPU 120 for adjusting focus and exposure in addition to the main CPU 110. The metering/distance-measuring CPU 120 controls the position of a focus lens 1110 of an image-taking optical system 111 and controls aperture changing. In addition, the metering/distance-measuring CPU 120 controls the operation of the LED emission controller 16a. The metering/distance-measuring CPU 120 causes the LED emission controller 16a to independently control the light emissions from LEDs 160a through 168a and to emit a light from at least one of these LEDs when a fill-flash is necessary. In order to independently stop emissions of the lights from these nine LEDs 160a through 168a, light-receiving sensors 1201 through 1209 are arranged corresponding to the irradiation areas to receive reflected lights from the corresponding irradiation areas. With this configuration, it is possible to measure a correct amount of fill-flash lights towards the irradiation areas and to stop the emission of the fill-flash lights immediately after a correct exposure is obtained.

In the first embodiment, a flash (fill-flash) timing controller 140 for matching irradiation timing with the timing of image frame processing.

In order to adjust focus, if a center-fixed AF mode among the AF modes is selected for example, the metering/distance-measuring CPU 120 fixes an AF area on a central point and moves the focus lens 1110 according the measured distance within the AF area by driving it. Alternatively, if the auto-area AF mode is selected, the metering/distance-measuring CPU 120 sets up, as an AF area, an area where the subject contrast is maximum by detecting the subject contrast for each area divided by the assistant lines 1500 shown in FIG. 1(b) and moves the focus lens 1110 to a position according to the measured distance within the AF area by driving it. Alternatively, if the selected-area AF mode is selected, the metering/distance-measuring CPU 120 moves the focus lens 1110 to a position according to the measured distance within the selected AF area by driving it.

In order to adjust exposure, metering results of the AF area and other areas are sent from the main CPU 110 to the metering/distance-measuring CPU 120. The metering/distance-measuring CPU 120 calculates, for example, an average brightness level and adjusts the aperture of a stop 1112 according to the calculated brightness level, thereby adjusting the amount of light to be supplied to the image-taking surface of the CCD 112.

In this embodiment, in response to an instruction from the main CPU 110, the metering/distance-measuring CPU 120 causes the LED emission controller 16a to emit fill-flash lights by controlling it according to a metering result, a distant measurement result and a shooting mode. The LED emission controller 16a includes nine LEDs 160a through 168a and the amount of light to be emitted from these LEDs are controlled by the LED emission controller 16a. The LED emission controller 16a independently controls the light amount for each area by changing the voltage to be applied to each of these LEDs and by changing the duty ratio of driving signals, thereby adjusting light distributions. After that, fill-flash lights are emitted to a subject.

The metering/distance-measuring CPU 120 is configured to stop the emission of fill-flash lights to the irradiation areas according to the amount of reflected lights from the irradiation areas received by the light-receiving sensors 1201 through 1209.

The metering/distance-measuring CPU 120 corresponds to the "emission-controlling section," the light-receiving sensors 1201 through 1209 correspond to the "light-receiving section," and the combination of the LED emission controller 16a and the LEDs 160a through 168a corresponds to the "light-emitting section" according to the invention.

Although the amount of light is adjusted in the present embodiment, on/off maybe controlled based on whether a voltage is applied to the LEDs or not.

Figure 3:
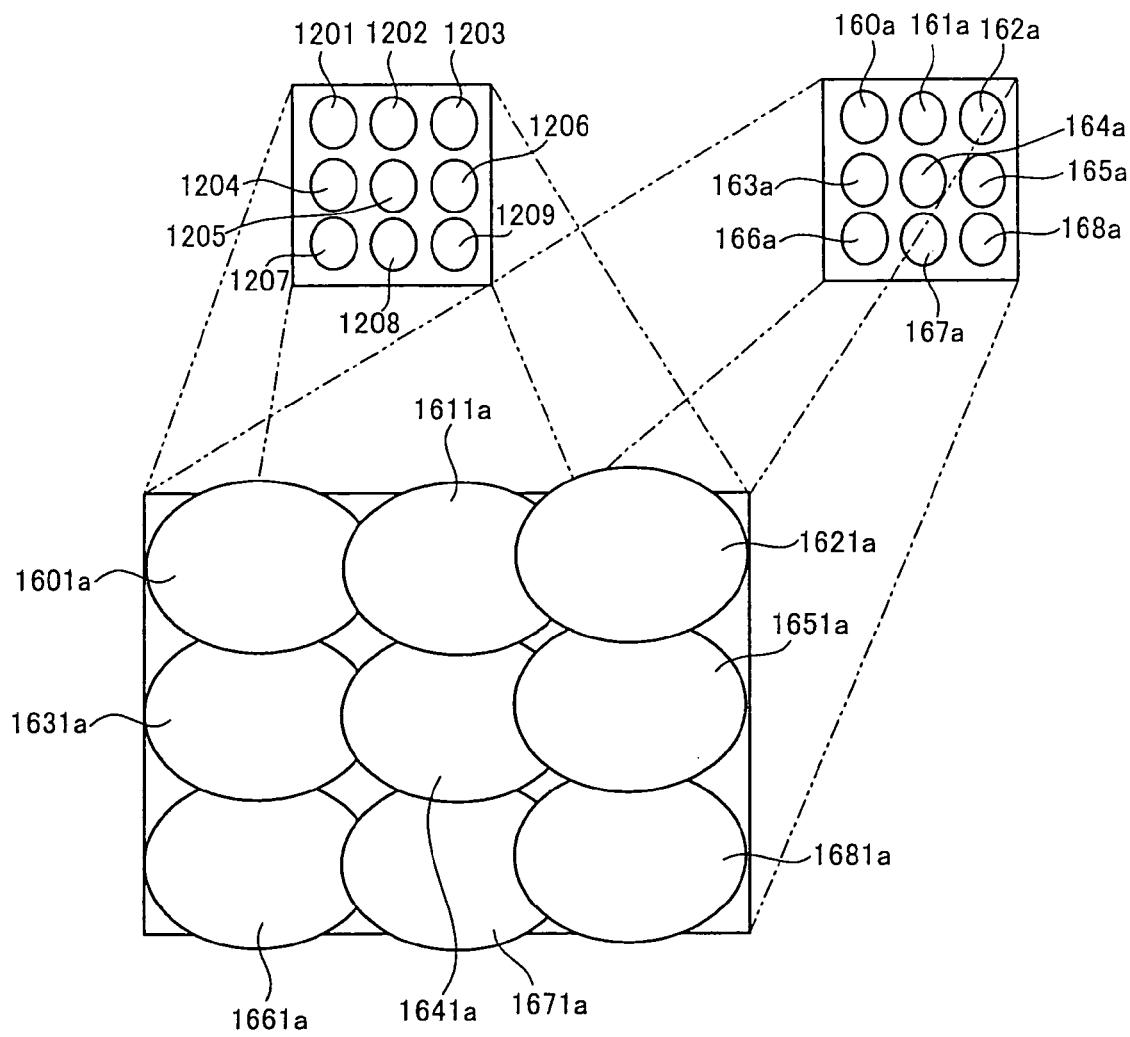
FIG. 3 is a diagram showing the correspondence of an array of nine LEDs of a light-emitting unit, an array of irradiation areas respectively associated with the LEDs and an array of light-receiving sensors used for light adjustment.

FIG. 3 shows a subject area (representing a shooting angle of view) to be captured by the image-taking optical system built in the lens barrel 170 shown in FIG. 1. FIG. 3 illustrates the correspondence of the array of the nine LEDs 160a through 168a of the light-emitting unit 16, the array of the irradiation areas 1601a through 1681a respectively associated with these LEDs and the array of the light-receiving sensors 1201 through 1209 used for light adjustment.

As shown in FIG. 3, a shooting angle of view is two-dimensionally divided into the irradiation areas 1601a through 1681a to be irradiated with independently-controlled fill-flash lights from the respective LEDs 160a through 168a. The reflected light from each of these areas is received by the corresponding one of the light-receiving sensors 1201 through 1209.

The irradiation areas 1601a through 1681a shown in FIG. 3 are in a one-to-one correspondence with the nine distance-measurement areas into which the light-receiving surface of the CCD 112 is divided. For example, when the auto-area AF mode is selected by a user operation, the main CPU 110 measures a distance for each of the irradiation areas 1601a, 1611a, 1621a, 1631a, 1641a, 1651a, 1661a, 1671a and 1681a. Upon receipt of the result of this distance measurement, the metering/distance-measuring CPU 120 adjusts the amount of light for each of these irradiation areas, thereby adjusting light distributions and subsequently allowing fill-flash lights to be emitted to a subject. A reflected light from each of the irradiation areas is received by the corresponding one of the light-receiving sensors 1201 through 1209. When the amount of received light reaches a predetermined value, the corresponding LED is stopped. That is, the metering/distance-measuring CPU 120 independently and sequentially stops the LEDs, thereby ceasing the emission of fill-flash lights. The metering/distance-measuring CPU 120 controls both emission and ceasing of fill-flash lights independently for the respective areas.

Now, there will be described the main processing of the program stored in the EEPROM 110a and subsequently exposure (including processing for obtaining a correct exposure by light adjustment) related to the emission of fill-flash lights in the main processing in detail.

First, the main processing performed by the main CPU 110 will be described with reference to FIG. 4.

Figure 4:
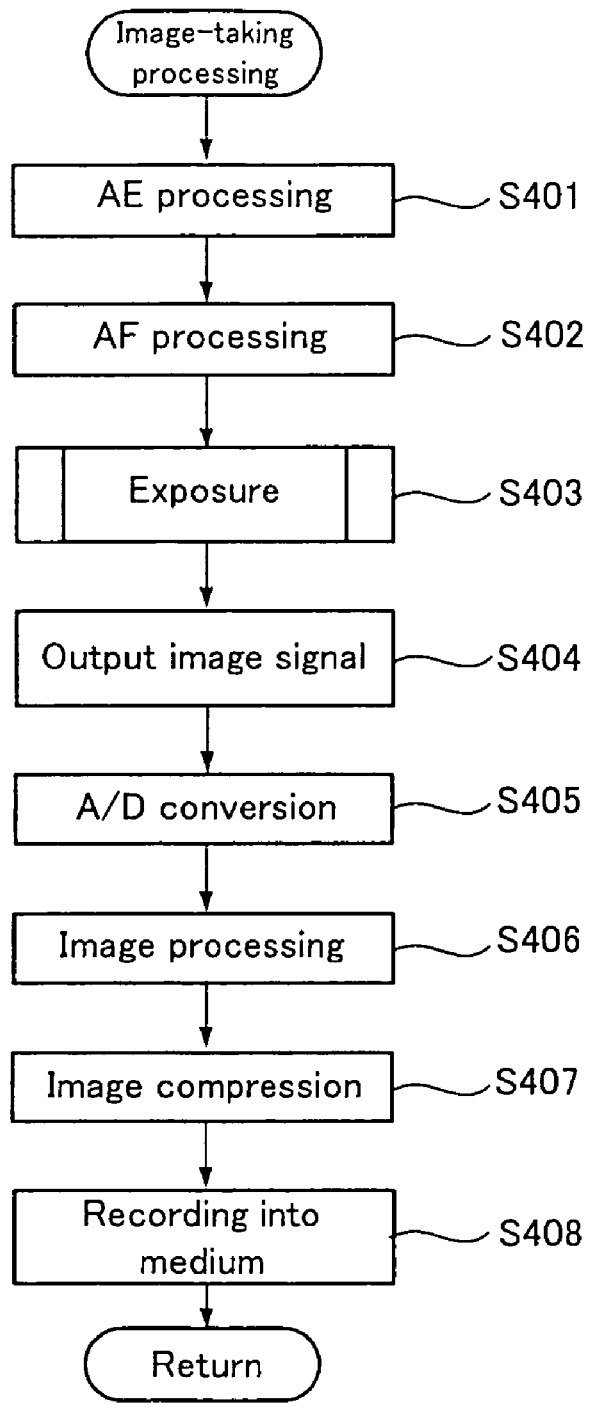
FIG. 4 is a flowchart showing a procedure of the main processing performed by a main CPU when shooting an image by emitting fill-flash lights to a subject.

FIG. 4 is a flowchart showing the procedure of the main processing performed by the main CPU 110 when shooting an image by emitting fill-flash lights to a subject.

In response to a half press of the release button 102, the main CPU 110 performs AE processing, i.e. TTL metering, at step S401 and transmits the result to the metering/distance-measuring CPU 120, thereby causing it to adjust the aperture of the stop 112 based on the result. Subsequently, the main CPU 110 performs AF processing at step S402. Since the digital camera of the first embodiment has various AF modes such as the center-fixed AF mode, selected-area AF mode and auto-area AF mode, it is possible to detect an optimum focus for each area by sampling brightness levels to obtain a subject contrast per area and a focus can be detected only for a selected area or only for a central area in the AF processing at step S402.

In the AF processing, even if any of the AF modes is selected, the main CPU 110 causes the metering/distance-measuring CPU 120 to move the focus lens 1110 and detects a focus by sampling subject contrast for each area or a predetermined area while the focus lens 1110 is moving. The main CPU 110 then transmits the AF information including the focus position and the subject distance measured for each area to the metering/distance-measuring CPU 120, so that the metering/distance-measuring CPU 120 can move the focus lens 1110 to the focus position based on the AF information. Subsequently, at step S403, upon detection of a full press of the release button 102, the main CPU 110 transmits the detected timing to the metering/distance-measuring CPU 120 so that the metering/distance-measuring CPU 120 causes the CG 1121 to supply an exposure-starting signal to the CCD 112, causing the CCD 112 to start exposure. If it is necessary to emit fill-flash lights when the exposure is started by the CCD 112, the main CPU 110 causes the metering/distance-measuring CPU 120 to calculate an amount of light according to the subject distance for each area and causes the LED emission controller 16a to emit the calculated amount of light from the LEDs 160a through 168a. Further, the main CPU 110 causes the light-receiving sensors to receive reflected lights from the areas while the LEDs are emitting fill-flash lights to a subject, and then performs time integration of the amount of the received light for each area. If a time-integration value reaches a predetermined value, the main CPU 110 independently stops a light emission per area.

When the light emission for each area after the light adjustment is stopped at the correct amount of light, the main CPU 110 closes the electronic shutter by supplying an exposure-ending signal from the CG 1121 to the CCD 112 upon completion of the exposure and causes the CCD 112 to output image signals to the A/D section 113 at step S404. Subsequently at step S405, the main CPU 110 causes the A/D section 113 to convert analog image signals into digital image signals that are sent to the white-balance adjustment γ processing section 114. At step S406, the main CPU 110 causes the white-balance adjustment γ processing section 114 to subject the signals to image processing and the image signals after the image processing are then output to the buffer memory 115. The image signals received by the buffer memory 115 are then supplied to the YC processing section 116 at appropriate timing where the image signals are subjected to image processing. Subsequently at step S407, the main CPU 110 causes the compression/decompression section 117 to compress the image signals and causes the I/F 118 to record the compressed signals into the memory card 119 at step S408 and the flow ends.

The digital camera 100 of the present embodiment is intended to obtain a correct exposure by emitting fill-flash lights with appropriate light distributions to a subject and stops the emission for each area. In order to obtain a correct exposure, the digital camera 100 performs light adjustment in the exposure processing at step S403. The exposure processing at step S403 will be described below more in detail.

Figure 5:
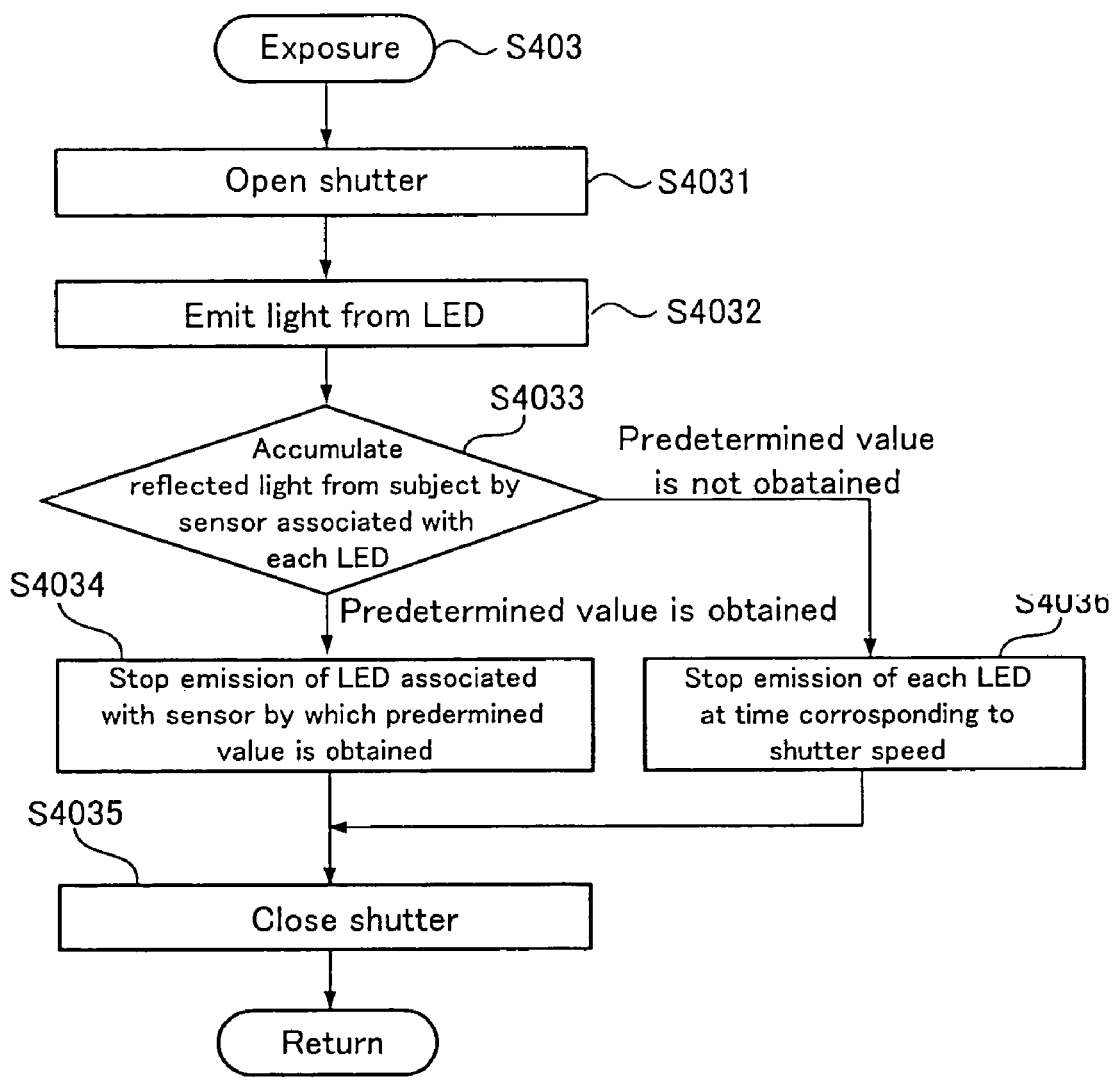
FIG. 5 is a flowchart showing the details of an exposure processing.

FIG. 5 is a flowchart showing the details of the exposure processing at step S403.

At step S4031, in response to a full press of the release button 102, the main CPU 110 opens the electronic shutter (and a mechanical shutter if provided) by causing the CG 1121 to supply an exposure-starting signal to the CCD 112. Subsequently at step S4032, the main CPU 110 causes the LEDs 160a through 168a to emit fill-flash lights to a subject. At the next step S4033, the main CPU 110 causes the light-receiving sensors 1201 through 1209 to receive a reflected light from each area and performs time integration of the amount of the received light. If it is determined that a value, which is obtained by time integration within a time period shorter than a shutter speed at step S4033, reaches a predetermined value at step S4033, the flow goes to step S4034 where the CPU 110 independently stops the emissions of the LEDs 160a through 168a associated with the light-receiving sensors 1201 through 1209. If it is determined that a value does not reach the predetermined value even after a lapse of time equal to the shutter speed at step S4033, the flow goes to step S4036 where the CPU 110 stops the emissions of the LEDs at the time corresponding to the shutter speed.

After stopping the emission at step S4034 or S4036, the flow goes to step S4035 where the CPU 110 closes the electronic shutter (and a mechanical shutter) and ends.

As described above, the invention realizes an image-taking apparatus having a light adjustment function to obtain a correct exposure for the entire screen regardless of subject position and distance.

FIGS. 6, 7, 8(a) and 8(b) illustrate a second embodiment of the invention. The same components as those used in the first embodiment will be denoted by the same reference characters.

FIGS. 6(a) and 6(b) show an external appearance of a digital camera 100A according to the second embodiment. FIG. 7 shows an internal configuration of the digital camera 100A shown in FIGS. 6(a) and 6(b). FIGS. 8(a) and 8(b) show a subject area (representing a shooting angle of view) to be captured by an image-taking optical system built in the lens barrel 170 shown in FIGS. 6(a) and 6(b).

In this digital camera 10A, the main CPU 110 (or metering/distance-measuring CPU 120) performs light adjustment by emitting pre-flash lights and causing the CCD 112 to receive reflected lights from a subject. Therefore, the digital camera 100A is provided with no window similar to the light adjustment window 106 shown in FIG. 1 and no sensors similar to the light-receiving sensors 1201 through 1209 shown in FIG. 2. Except for such difference, the digital camera 100A shown in FIGS. 6(a) and 6(b) is the same as the digital camera 100 shown in FIG. 1.

FIG. 8(a) shows a shooting angle of view that is two-dimensionally divided into irradiation areas 1601a, 1611a, 1621a, 1631a, 1641a, 1651a, 1661a, 1671a and 1681a to which the LEDs 160a through 168a emit fill-flash lights. FIG. 8(b) shows distance-measurement areas 15011, 15012, 15013, 15014, 15015, 15016, 15017, 15018 and 15019 set up in the shooting angle of view.

FIGS. 8(a) and 8(b) show an example in which a shooting angle of view is divided into nine areas (3×3=9). The distance-measurement areas shown in FIG. 8(b) are in a one-to-one correspondence with the irradiation areas shown in FIG. 8(a).

When the irradiation areas and distance-measurement areas are in a one-to-one correspondence with each other in this way, if the auto-area AF mode is selected by a user operation for example, pre-flash lights can be emitted before the emission of a fill flash in the following manner. First, the CPU 110 measures a distance for each of the irradiation areas 1601a, 1611a, 1621a, 1631a, 1641a, 1651a, 1661a, 1671a and 1681a shown in FIG. 8(*a*). Subsequently, the metering/distance-measuring CPU 120 causes the LED emission controller 16a to adjust the amount of light to be emitted to each irradiation area based on the measured distance and causes the LEDs to emit each pre-flash light. After that, a reflected light resulting from the pre-flash light is received by the corresponding distance-measurement area. Based on the amount of the received reflected lights resulting from the pre-flash lights, the main CPU 110 or the metering/distance-measuring CPU 120 calculates the amount of fill-flash lights.

The procedure of the main processing performed by the main CPU 110 of the digital camera 100A of the second embodiment is the same as that shown in FIG. 5 and therefore, there will be described below only step S403 where light adjustment processing is performed.

Figure 9:
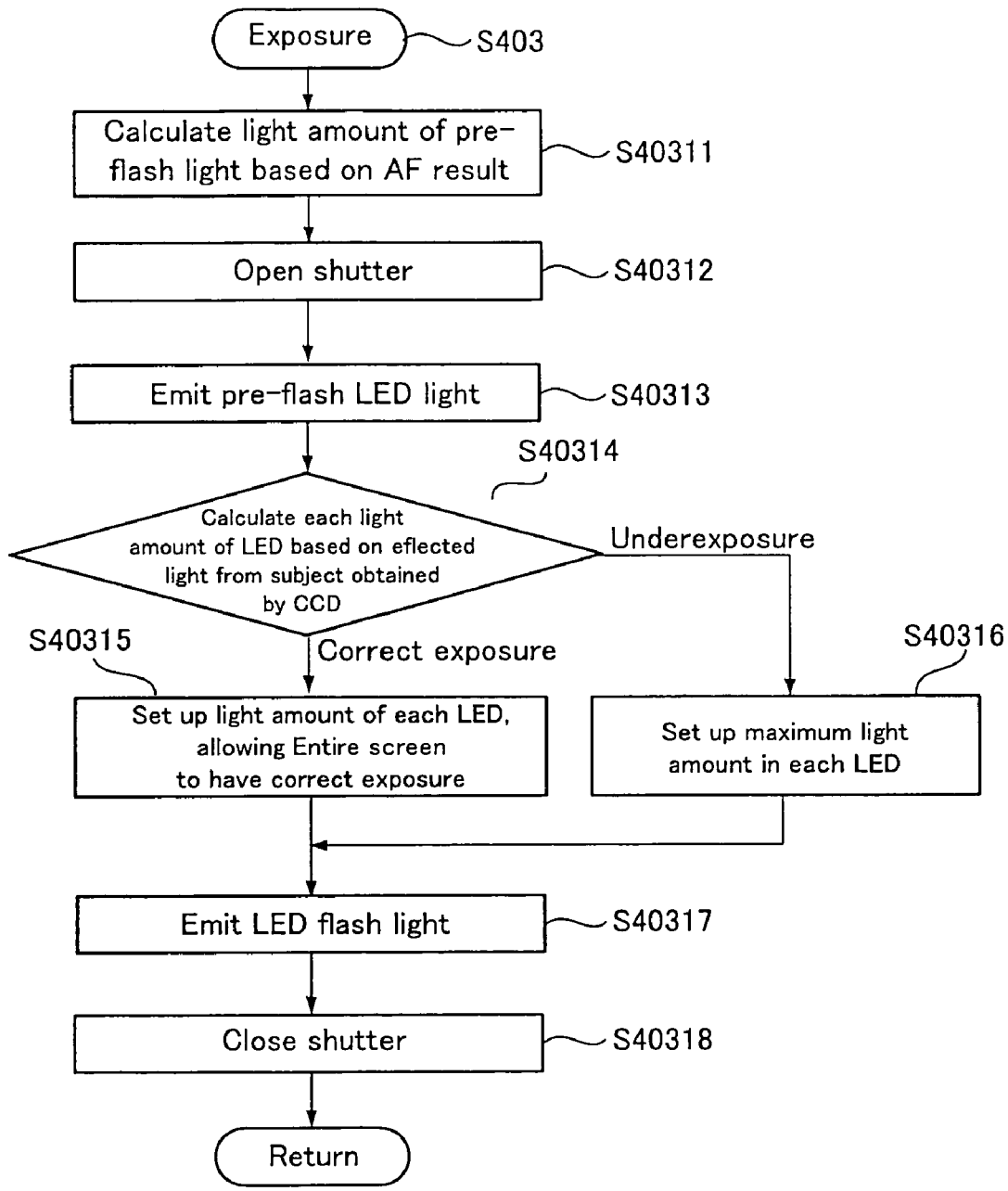
FIG. 9 is a flowchart showing the details of an exposure processing by a main CPU of the digital camera shown in FIGS. 6(a) and 6(b)

FIG. 9 is a flowchart showing the details of the exposure processing at step S403.

At step S40311, the main CPU 110 sends the result of distance measurement to the metering/distance-measuring CPU 120 and causes the CPU 120 to calculate the amount of pre-flash lights. At step S40312, in response to a full press of the release button 102, the main CPU 110 opens the electronic shutter (and a mechanical shutter if provided) by causing the CG 1121 to supply an exposure-starting signal to the CCD 112. Subsequently at step S40313, the main CPU 110 causes the LEDs 160a through 168a to emit pre-flashlights to a subject. At the next step S40314, the main CPU 110 causes the CCD 112 to receive reflected lights from the respective areas and calculates the amount of fill-flash lights based on the amount of the lights received by the CCD 112. If it is determined that the amount of reflected lights from the subject is insufficient and thus is likely to cause underexposure at step S40314, the flow goes to step S40316 where the amount of lights to be emitted from the LEDs 160a through 168a is made maximum and proceeds to step S40317 where the maximum amount of main fill-flash lights are emitted to the subject. Then, the shutter is closed at step S40318 and the flow ends.

In contrast, if it is determined based on the amount of reflected lights from the subject that a value indicating a correct exposure is obtained at step S40314, the flow goes to step S40315 where the amount of lights from the LEDs is adjusted such that a correct exposure is set up for the entire subject area and proceeds to step S40317 where the fill-flash lights are emitted to the subject. Then, the shutter is closed at step S40318 and the flow ends.

With this configuration, it is also possible to provide an image-taking apparatus having a light adjustment function to obtain a correct exposure for the entire screen regardless of subject position and distance.

Figure 10:
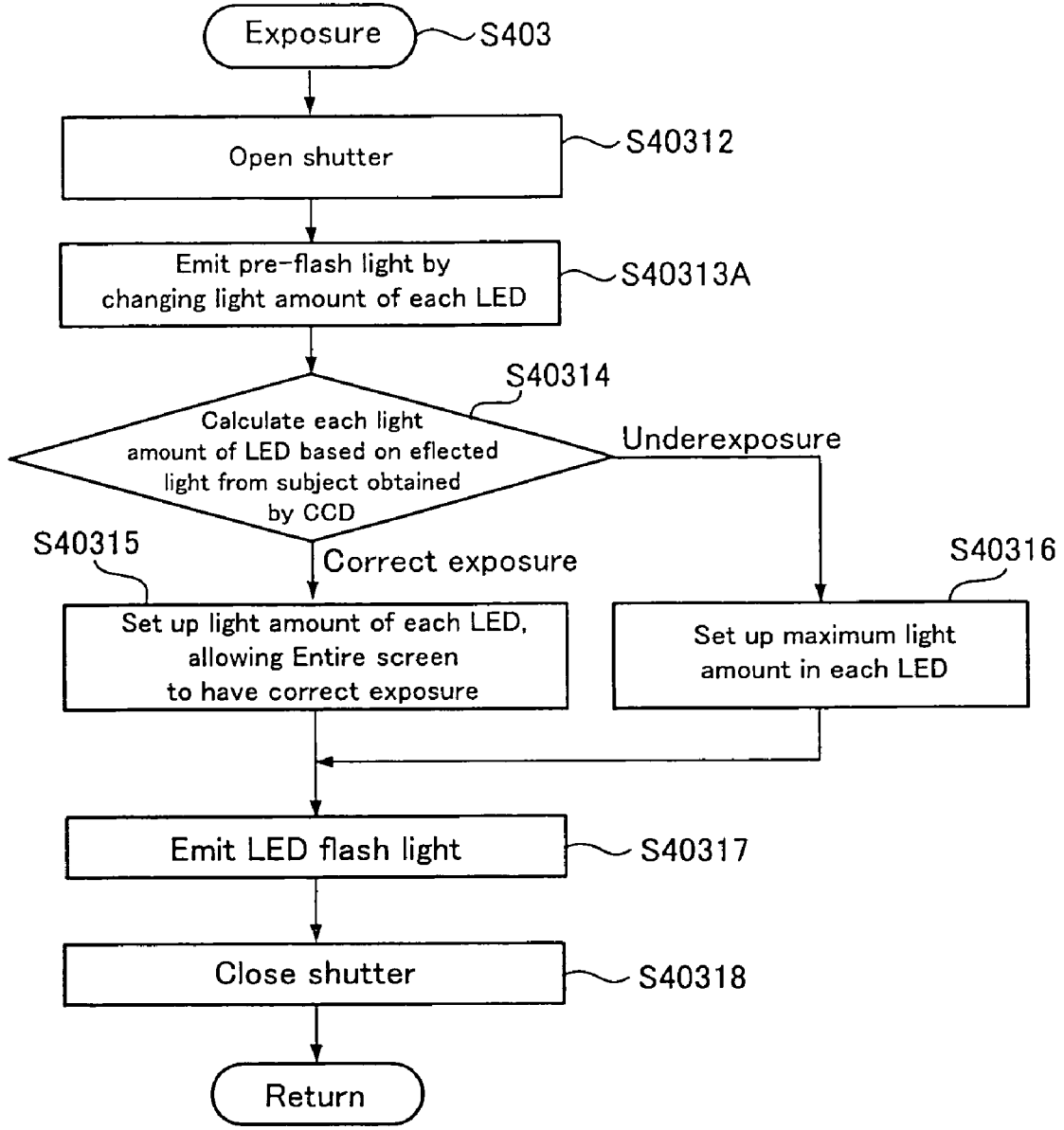
FIG. 10 is a flowchart showing a modification of FIG. 9.

FIG. 10 shows a modification of FIG. 9.

At step S40311 shown in FIG. 9, the amount of each pre-flash light is calculated based on the result of distance measurement and the pre-flash lights are emitted. However, such step S40311 is omitted in FIG. 10. A modification is made in FIG. 10 such that pre-flash lights whose amounts are each sequentially changed with time are emitted and a subject distance in each area is roughly measured using the pre-flash light at step S40313A, though it takes a slightly longer time.

In this modification, it is possible to emit fill-flash lights whose amounts are more precisely adjusted than the light adjustment based on the result of distance measurement, because the light amount can be determined by incorporating irradiation conditions for the fill-flash lights at the time of emitting pre-flash lights.

Accordingly, there is realized an image-taking apparatus having a light adjustment function to obtain a correct exposure for the entire screen regardless of subject position and distance.

Figure 11:
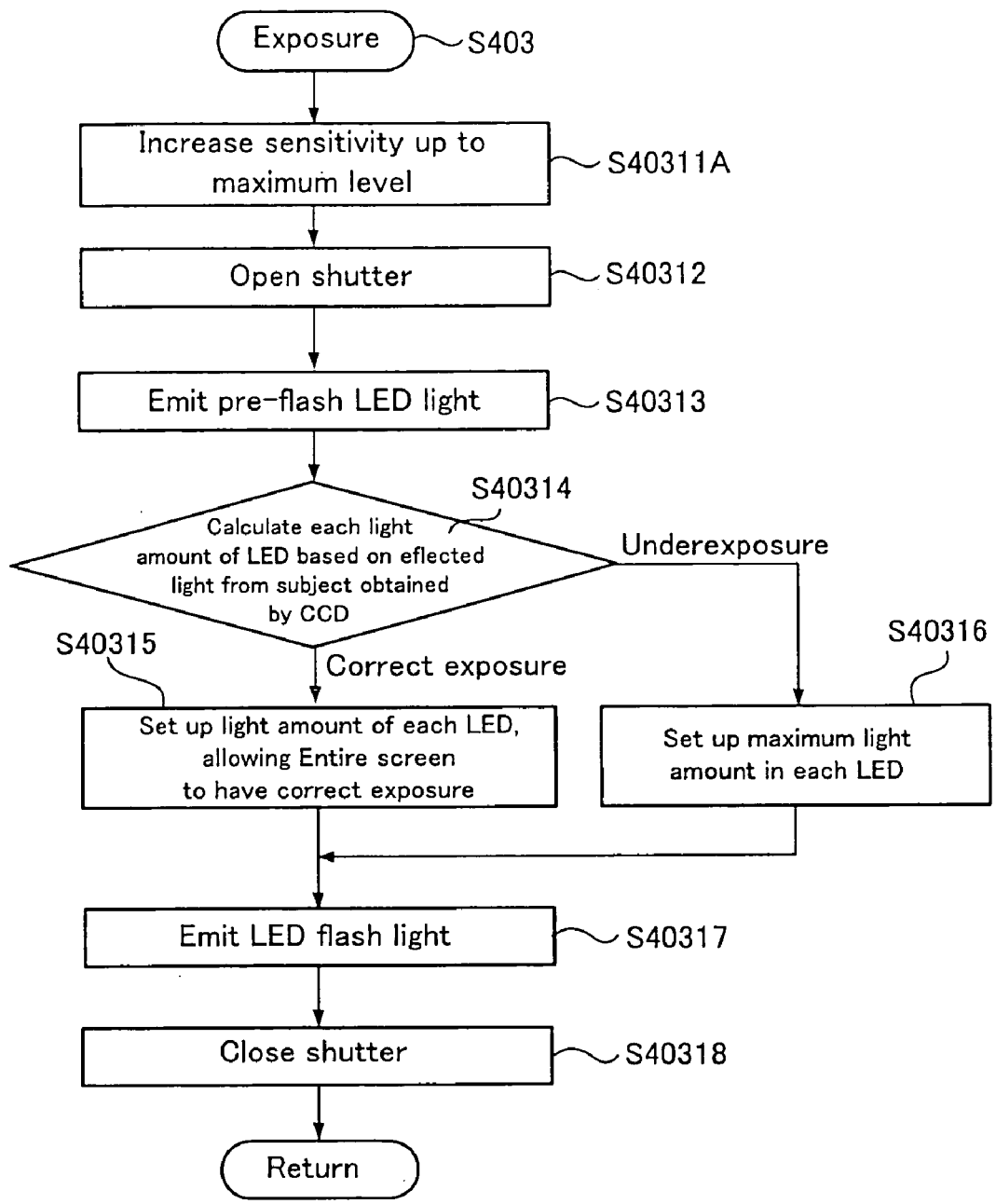
FIG. 11 is a flowchart showing another modification of FIG. 9.

FIG. 11 shows another modification of FIG. 9.

In FIG. 11, assuming that, for example, an amplifier with gain control terminal is built in the CCD, the metering/distance-measuring CPU 120 causes the amplifier to set up a gain greater than the gain to be used in shooting so that a light-reception sensitivity is made higher than that to be used in shooting at step S40311A. After that, the light-emitting unit 16 is caused to emit the pre-flash lights. The metering/distance-measuring CPU 120 corresponds to the "sensitivity-adjusting section" according to the invention. This enables the CCD 12 to satisfactorily receive the reflected lights resulting from pre-flash lights even if the time for emitting the pre-flash lights is short.

Generally, a CCD requires increase in the length of a time to emit pre-flash lights or in the amount of pre-flash lights when receiving the lights. In this modification however, such an increase is not necessary and therefore power can be saved.

Although this modification is configured such that an amplifier with gain control terminal is built in the CCD and a gain of the amplifier is controlled, it may be configured such that a program for mixing pixels is stored in the EEPROM 110a and processing for mixing pixels is performed by the main CPU 110.

Figure 12:
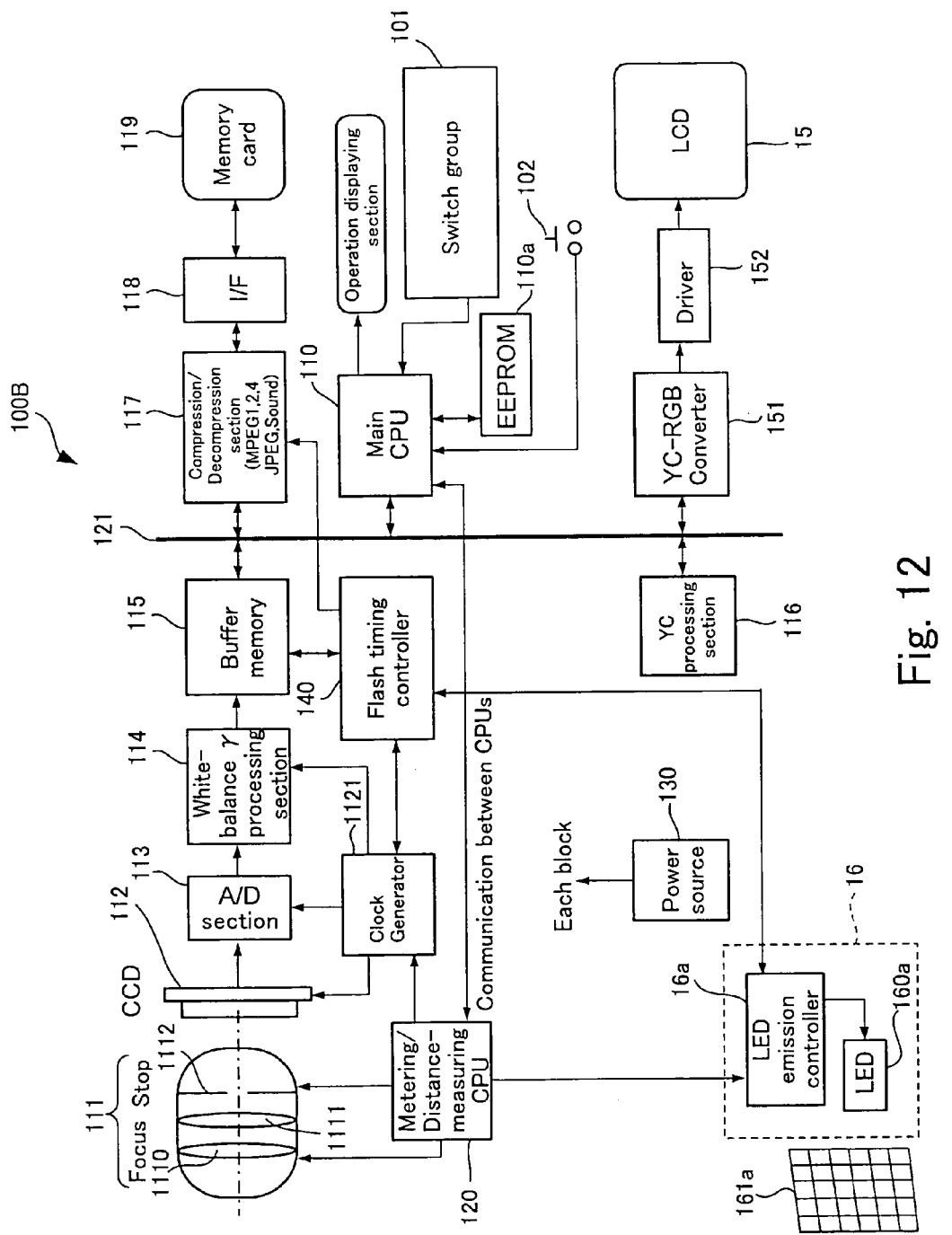
FIG. 12 is a diagram showing a third embodiment of the invention.
Figure 13:
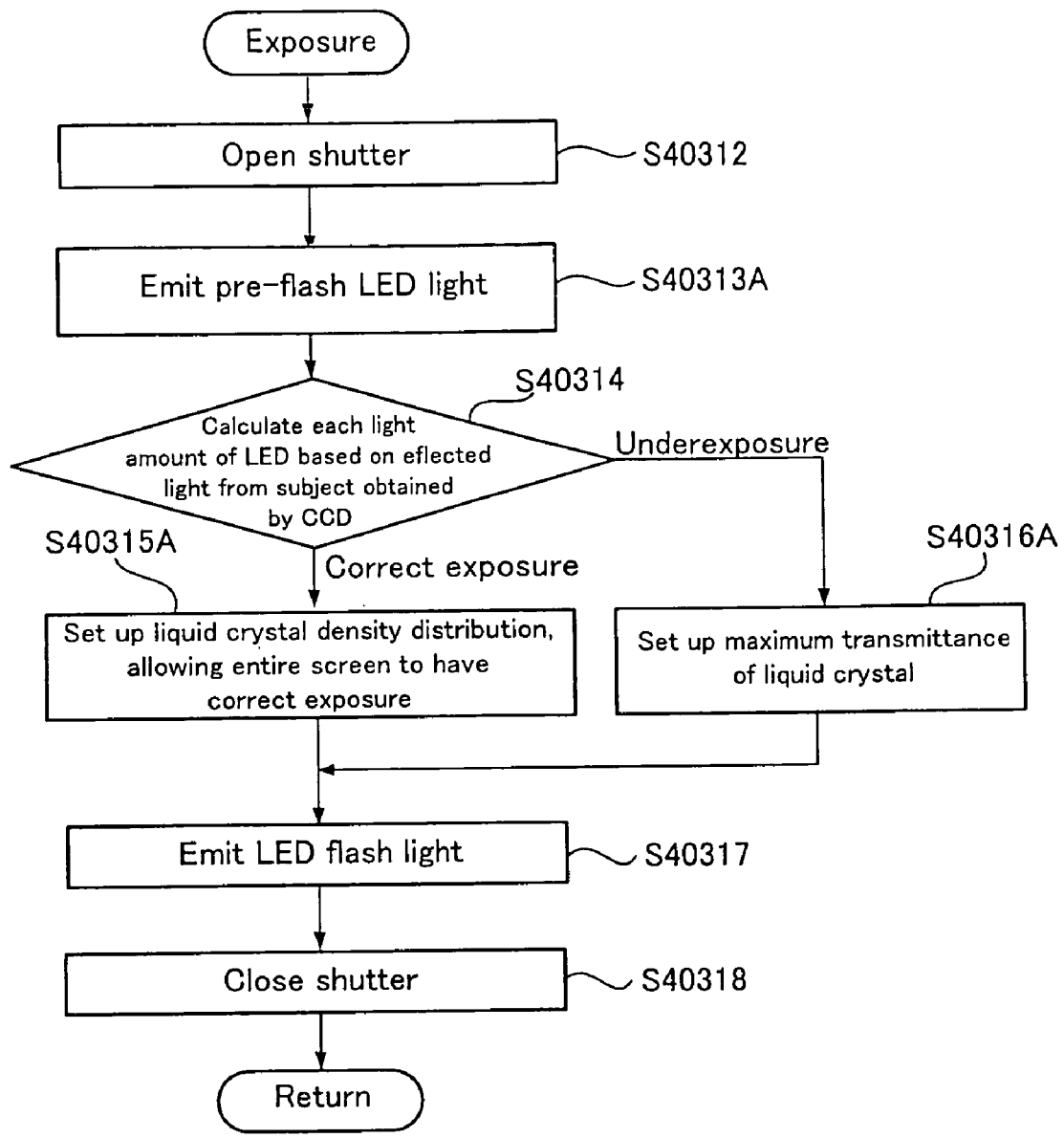
FIG. 13 is a flowchart showing a procedure of light adjustment processing included in the exposure processing during the main processing, which is performed by a main CPU within the digital camera shown in FIG. 12.

FIG. 12 and FIG. 13 illustrate a third embodiment of the invention. The same components as those used in the first embodiment will be denoted by the same reference characters.

Figure 6:
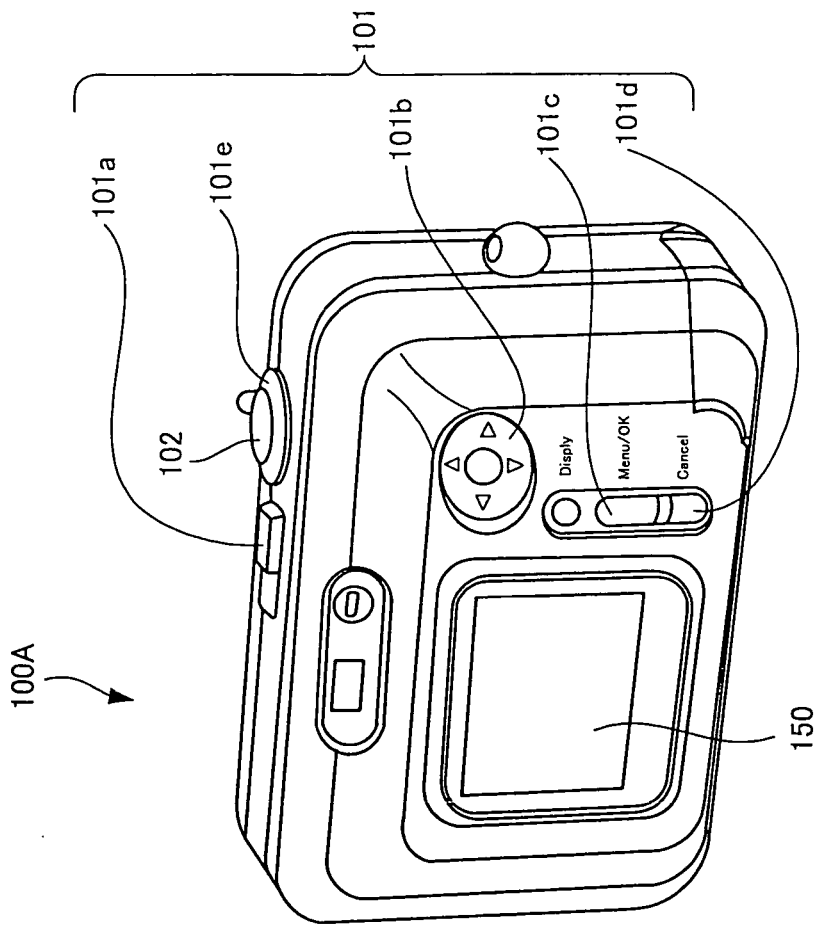
FIG. 6(a) is a perspective view of the front of a digital camera according to a second embodiment, as viewed obliquely from above.
FIG. 6(b) is a perspective view of the back of a digital camera according to the second embodiment, as viewed obliquely from above.
Figure 6:
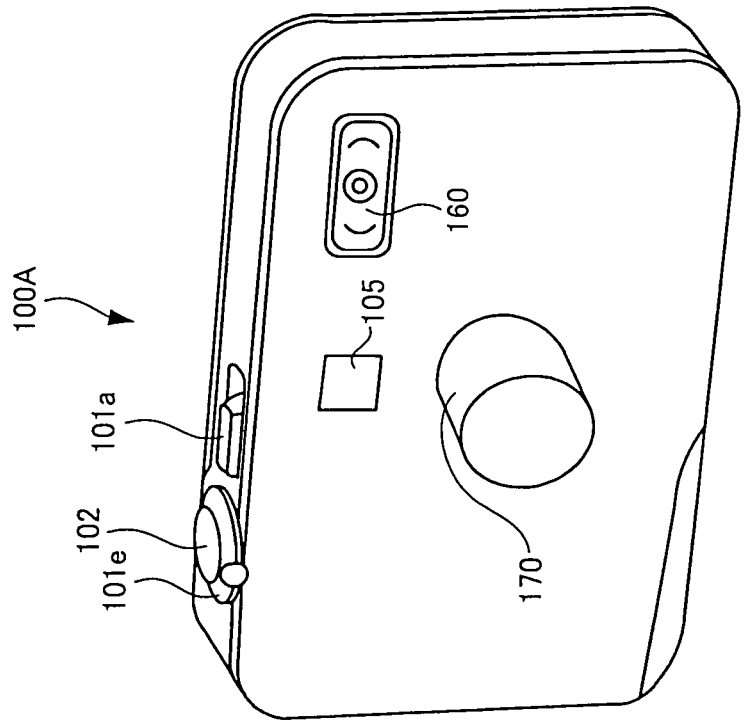
Figure 7:
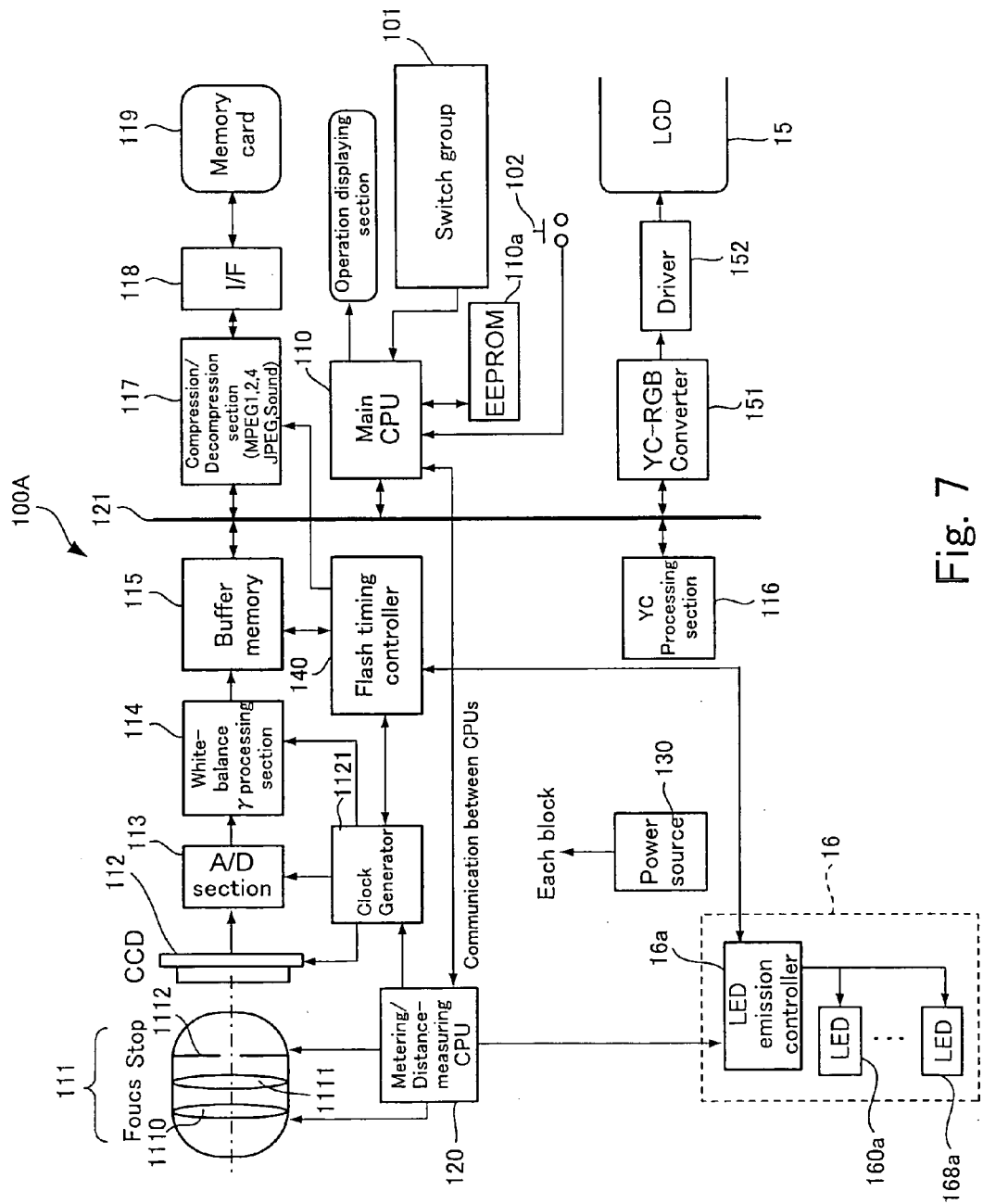
FIG. 7 is a diagram showing an internal configuration of the digital camera shown in FIGS. 6(a) and 6(b)

FIG. 12 shows a digital camera 100B whose external appearance is the same as that in FIGS. 6(*a*) and 6(*b*) but its internal structure is slightly different. In this embodiment, one LED 160a is employed unlike the second embodiment using the LEDs 160a through 168a and a liquid crystal shutter 161a having two-dimensionally arrayed areas is disposed in front of the LED 160a. This embodiment also enables independently-controlled fill-flash lights to be emitted to corresponding irradiation areas by changing the density of each area of the liquid crystal shutter 161a.

FIG. 13 is a flowchart showing the procedure of light adjustment processing included in exposure processing at step S403 during the main processing, which is performed by the main CPU 110 within the digital camera 110B shown in FIG. 12.

This processing is the same as that shown in FIG. 9 except that steps S40315 and S40316 in FIG. 9 are respectively replaced with steps S40315A and S40316A where the density of each area of the liquid crystal shutter 161a is adjusted.

With the third embodiment, it is also possible to obtain the same effects as those of the first and second embodiments.

As described above, the invention realizes an image-taking apparatus having a light adjustment function to obtain a correct exposure for the entire screen regardless of subject position and distance.

In the above-described embodiments, fill-flash lights, for example, from the LEDs 160a through 168a in FIG. 3 are all emitted at the same time. However, fill-flash lights may be sequentially emitted from, for example, the LED 160a, LED 161a, and LED 162a and so on in FIG. 3 to corresponding areas.

What is claimed is:

1. An image-taking apparatus which includes an imaging device and generates image signal by forming a subject image on the imaging device, comprising:
- a light emitting section which emits independently-controlled light to a plurality of irradiation areas into which a shooting angle of view is two-dimensionally divided;
- a light-receiving section which receives reflected light independently from the plurality of irradiation areas;
- an emission-controlling section which causes the light-emitting section to emit pre-emission light to the plurality of irradiation areas before taking an image and which causes the light-emitting section to emit fill light for shooting to the plurality of irradiation areas based on the amount of reflected light from the plurality of irradiation areas received by the light-receiving section, which resulted from the pre-emission light, when taking an image, and
- a distance-measuring section which measures a subject distance,
- wherein the emission-controlling section causes the light-emitting section to emit pre-emission light whose amount is based on a result of distance measurement by the distance-measuring section.

2. The image-taking apparatus according to claim 1, wherein the light-receiving section is the imaging device serving as a light-receiving sensor.

* * * * *